US00RE41263E

(19) United States
(12) Reissued Patent
Dudley

(10) Patent Number: US RE41,263 E
(45) Date of Reissued Patent: Apr. 27, 2010

(54) REFRIGERANT CHARGING TOOL

(75) Inventor: Newton Howard Dudley, Blum, TX (US)

(73) Assignee: Technical Chemical Company, Cleburne, TX (US)

(21) Appl. No.: 11/205,303

(22) Filed: Aug. 16, 2005

Related U.S. Patent Documents

Reissue of:
(64) Patent No.: 6,655,407
Issued: Dec. 2, 2003
Appl. No.: 10/407,659
Filed: Apr. 4, 2003

(51) Int. Cl.
*B67B 7/48* (2006.01)
*B23B 41/08* (2006.01)
*F16K 43/00* (2006.01)

(52) U.S. Cl. ..... 137/318; 137/614.05; 137/883; 62/292; 62/294; 81/421; 81/423; 81/426; 30/443; 141/329; 141/348; 222/5; 222/81; 222/83; 222/83.5

(58) Field of Classification Search ..... 137/318, 137/15.13, 15.14, 317, 614.05, 883; 141/329, 141/348; 222/5, 81, 83, 83.5; 30/443; 62/292, 62/294; 81/421, 423, 426
See application file for complete search history.

(56) References Cited

U.S. PATENT DOCUMENTS 2,008,807 A * 7/1935 Williams ..... 222/82
3,038,490 A * 6/1962 Yocum ..... 137/318
3,147,887 A * 9/1964 Brooks ..... 222/83.5
3,162,211 A * 12/1964 Barusch ..... 137/318
3,252,475 A * 5/1966 Jones ..... 137/318
3,303,968 A * 2/1967 Compere ..... 222/82
3,336,937 A * 8/1967 Ehrens et al. ..... 137/318
3,370,752 A * 2/1968 Abler ..... 222/83.5
3,395,724 A * 8/1968 Hamel ..... 137/318
3,548,861 A * 12/1970 Mullins ..... 137/318
3,661,169 A * 5/1972 Mullins ..... 137/318
3,698,419 A * 10/1972 Tura ..... 137/318
3,973,584 A * 8/1976 McKinnon et al. ..... 137/318
3,996,765 A * 12/1976 Mullins ..... 62/292
4,112,944 A * 9/1978 Williams ..... 604/244
4,204,559 A * 5/1980 Wagner ..... 137/318
4,316,622 A * 2/1982 Nelson ..... 285/119
4,338,793 A * 7/1982 O'Hern, Jr. ..... 62/292
4,644,973 A * 2/1987 Itoh et al. ..... 137/883
4,852,769 A * 8/1989 Robertson et al. ..... 222/83.5
5,291,914 A * 3/1994 Bares et al. ..... 137/15.13
5,301,532 A * 4/1994 Bickmore et al. ..... 72/325
5,373,866 A * 12/1994 Whalen, II ..... 137/318
5,398,718 A * 3/1995 Roinick, Sr. ..... 137/318
6,041,810 A * 3/2000 Dudley ..... 137/318
6,053,362 A * 4/2000 Lin ..... 222/80

* cited by examiner

*Primary Examiner*—Kevin L Lee
(74) *Attorney, Agent, or Firm*—Marlin R. Smith; Smith IP Services, P.C.

(57) ABSTRACT

A refrigerant charging tool. In a described embodiment, a refrigerant charging tool has two separately formed handles pivotably attached to each other. One of the handles has a container piercing member mounted thereon. Interchangeable spacers are configured for attachment to the other handle, so that a selected one of differently shaped containers may be biased against the container piercing member when the handles are pivoted toward each other.

29 Claims, 3 Drawing Sheets

REFRIGERANT CHARGING TOOL

Matter enclosed in heavy brackets [ ] appears in the original patent but forms no part of this reissue specification; matter printed in italics indicates the additions made by reissue.

BACKGROUND OF THE INVENTION

The present invention relates generally to tools utilized in conjunction with refrigeration systems and, in an embodiment described herein, more particularly provides a refrigerant charging tool.

It is common practice to introduce fluid into a refrigeration system, such as an automotive air conditioning system, from a container in which the fluid is commercially packaged. For example, relatively small quantities of refrigerants such as R-12 and R-134a are typically packaged in generally cylindrical cans. A special purpose tool is commonly utilized to dispense the refrigerant and/or other fluid (e.g., lubricant, leak detector, seal rejuvenator, etc.) into the refrigerant system.

Many forms of these tools have been promulgated in the past, each of which typically includes a means for securing the container, a means for piercing the container, a means for sealing the pierced container, and a means for delivering the fluid from the pierced container to the refrigeration system. In one such tool, the container is secured by encircling the container within a flexible ring portion extendably attaching two handles to each other. A hollow piercing needle projects inwardly from the ring opposite a portion of the tool where the handles are squeezed together. When the handles are squeezed together, the circumference of the ring decreases, thereby forcing the container against the needle, and eventually causing the needle to puncture the container. If the container is substantially smaller than the ring (i.e., if the ring is sized for a larger container, such as a refrigerant can, as opposed to a smaller container, such as a typical oil charge can), a spacer must be utilized in the area between the container and the portion of the tool where the handles are squeezed together.

Unfortunately, such tools require a relatively large force to squeeze the handles together, due to the fact that the container presses against the portion of the tool where the handles are squeezed together, at the same time as the handles are being squeezed together. Additionally, where the spacer is utilized, the spacer must be positioned adjacent the portion of the tool where the handles are squeezed together, which positioning is relatively difficult to accomplish, and difficult to maintain while the handles are being squeezed together. Furthermore, the placement of the needle on the ring opposite the portion of the tool where the handles are squeezed together prevents convenient use of a hinged pivotable attachment between the handles at that position. Still further, such tools do not have interchangeable spacers to accommodate differently shaped containers of refrigerant or other fluids, for example, standard sized cans of R-12 and R-134a refrigerant and oil charge cans.

From the foregoing, it can be seen that it would be quite desirable to provide a tool which does not require the container to press against a portion of the tool being squeezed together, and which does not require, for smaller containers, that a spacer be positioned at the portion of the tool being squeezed together, but which permits enhanced convenience in utilization of the tool, and which includes spacers configured to accommodate differently shaped containers. It is accordingly an object of the present invention to provide such a tool.

SUMMARY OF THE INVENTION

In carrying out the principles of the present invention, in accordance with an embodiment thereof, a refrigerant charging tool is provided which is configured to permit convenient use thereof with differently shaped containers.

In broad terms, a tool is provided for use in dispensing fluid from a selected one of differently shaped containers into a refrigeration system. The tool includes two pivotably attached handles, a container piercing member, and interchangeable container spacers.

Each of the handles has a grip portion and a container receiving portion. The handles are separately formed from each other and are pivotably attached via a hinged connection opposite the grip portion of each handle. Each container receiving portion is generally semi-circular shaped. The handles are releasably securable in a closed position by a locking device positioned between the handle grip portions.

The container piercing member projects inwardly from one of the handle container receiving portions. A selected one of two container spacers releasably attaches to one of the handle container receiving portions. The container spacers are each configured to position the correspondingly shaped container laterally away from one of the handle container receiving portions and toward the container piercing member.

These and other features, advantages, benefits and objects of the present invention will become apparent to one of ordinary skill in the art upon careful consideration of the detailed description of a representative embodiment of the invention hereinbelow and the accompanying drawings.

DETAILED DESCRIPTION

Figure 1:
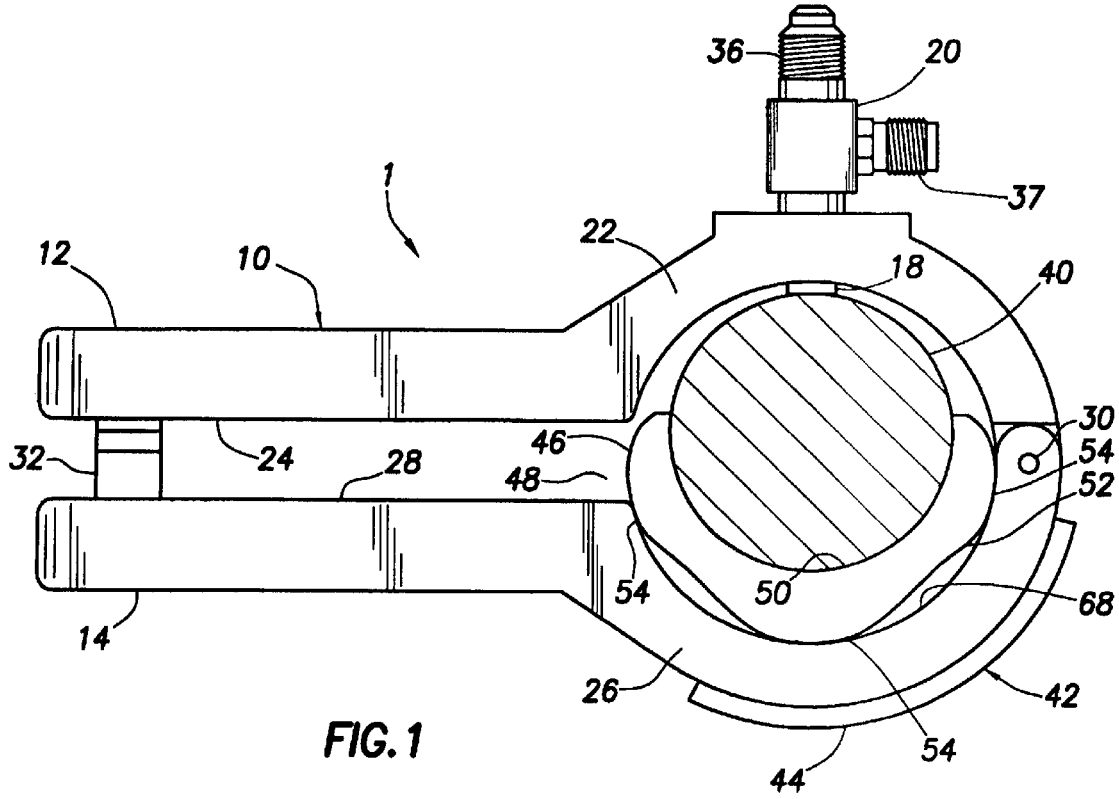
FIG. 1 is an elevational view of a refrigerant charging tool embodying principles of the present invention, illustrating its use with a relatively small container and a spacer specially configured therefor.
Figure 2:
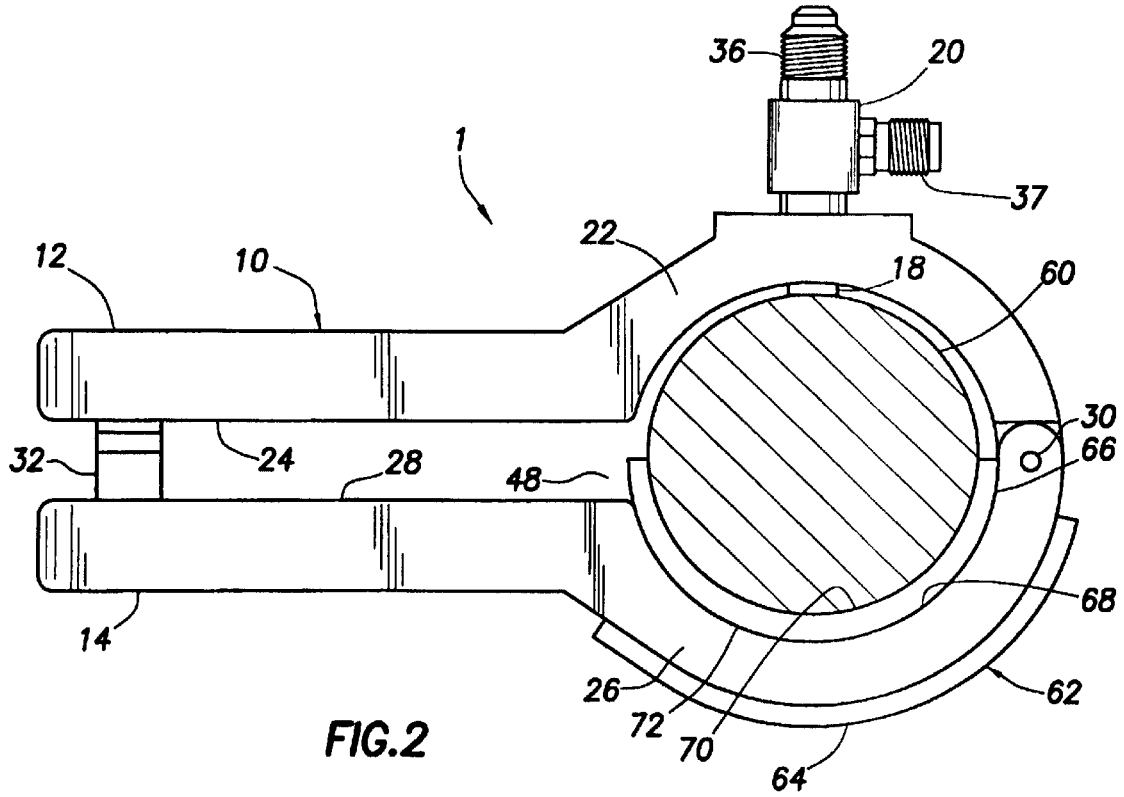
FIG. 2 is an elevational view of the refrigerant charging tool, illustrating its use with a relatively large container and a spacer specially configured therefor.

Representatively illustrated in FIGS. 1 & 2 is a refrigerant charging tool 1 which embodies principles of the present invention. In the following description of the tool 1 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., without departing from the principles of the present invention.

The tool 1 includes a handle assembly 10 and two interchangeable spacers. In FIG. 1, the tool 1 is depicted with a spacer 42 installed therein, so that the tool accommodates a relatively small diameter container 40 of an oil charge.

Preferably, the container 40 is an industry standard oil charge container commonly referred to as a 202×406 size container. The spacer 42 is configured with an inner side surface radiused to conform to the shape of the container 40 and space it appropriately toward a piercing member 16 (see FIG. 4).

In FIG. 2, the tool 1 is depicted with another spacer 62 installed therein, so that the tool accommodates a somewhat larger diameter container 60 of refrigerant. Preferably, the container 60 is an industry standard container of R-12 refrigerant commonly referred to as a 211×413 size container. The spacer 62 is configured with an inner side surface 70 radiused to conform to the shape of the container 60 and space it appropriately toward the piercing member 16.

Figure 3:
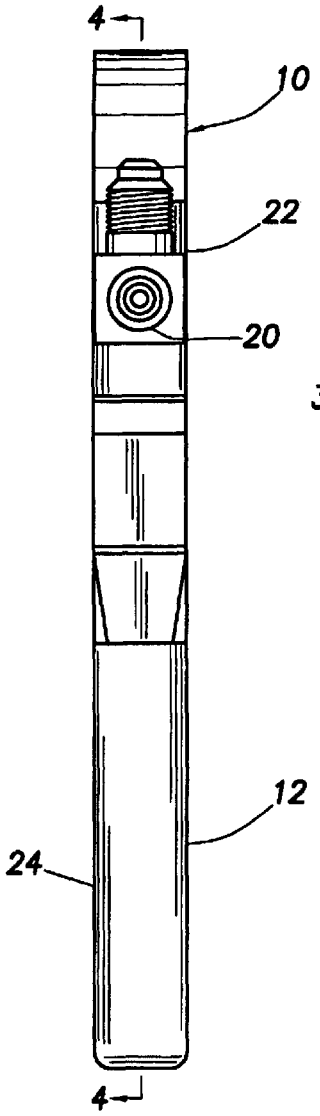
FIG. 3 is a side elevational view of a handle assembly of the tool.
Figure 4:
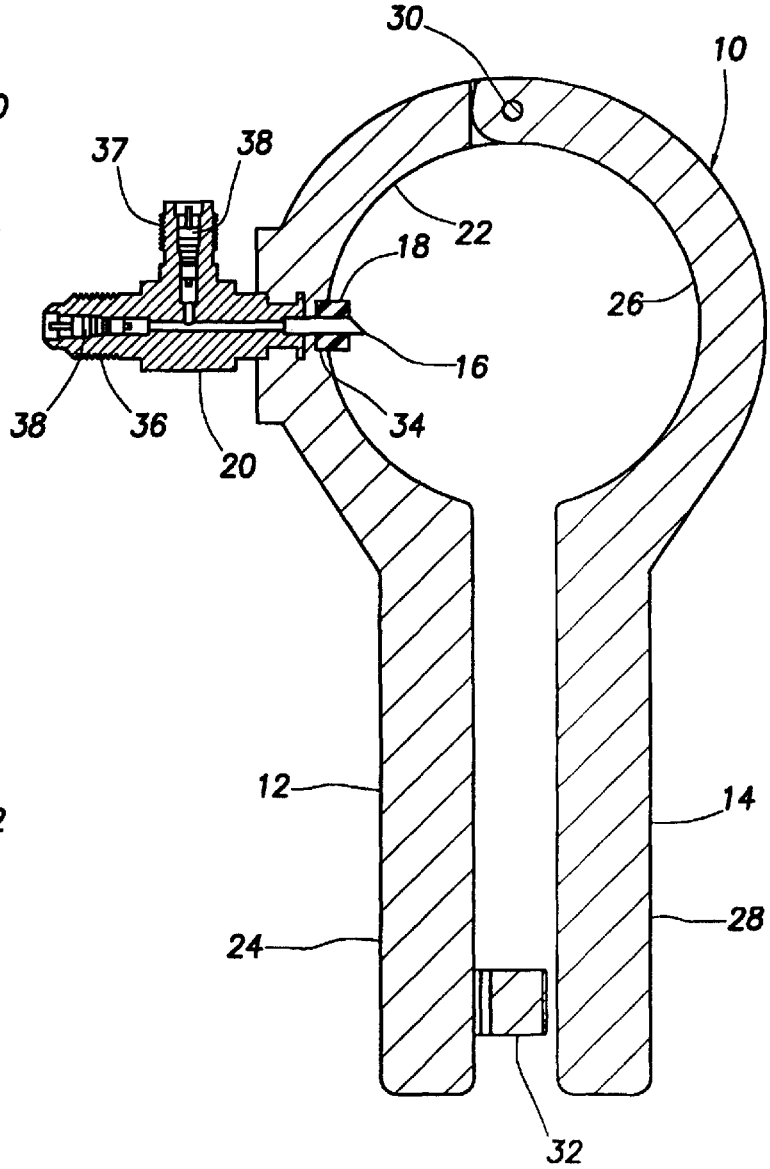
FIG. 4 is a cross-sectional view through the handle assembly, taken along line 4—4 of FIG. 3.
Figure 5:
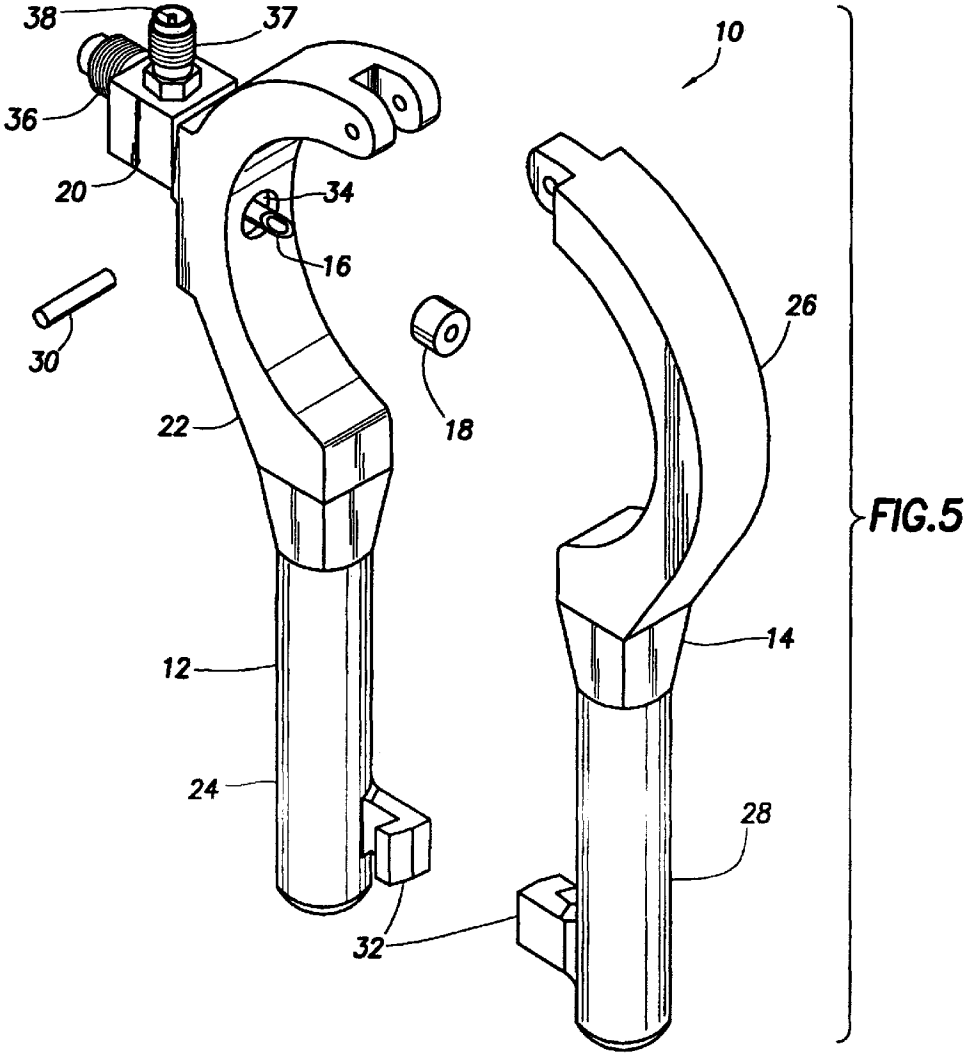
FIG. 5 is an exploded isometric view of the handle assembly, illustrating the assembly of various elements of the handle assembly.

Referring additionally now to FIGS. 3–5, the handle assembly 10 includes two handles 12, 14, the container piercing member 16, an annular gasket 18 surrounding the piercing member, and a T-fitting 20. The T-fitting 20, including multiple threaded connections 36, 37 thereon, is in fluid communication with the container piercing member.

The handle 12 has a generally semi-circular shaped container receiving portion 22 and a generally cylindrical grip portion 24. Similarly, the handle 14 includes a generally semi-circular shaped container receiving portion 26 and a generally cylindrical grip portion 28. Note that the handles 12, 14 are separately formed from each other, but are pivotably attached to each other by means of a pivot pin 30 installed through each of the handles adjacent the container receiving portions 22, 26, forming a hinged connection. A locking device 32 positioned between the grip portions 24, 28 releasably secures the handles 12, 14 in a closed position, as described more fully below.

The piercing member 16 is representatively illustrated as a hollow needle. The interior of the hollow piercing member 16 is in fluid communication with each of the threaded connections 36, 37. Of course, other types of container piercing members could be provided. For example, it is not necessary for the piercing member 16 to be hollow, or for it to be in the shape of a needle.

The gasket 18 is retained in a recess 34 formed on an inner side surface of the container receiving portion 22. The gasket 18 preferably contacts a container and seals between the handle 12 and the container before the container is pierced by the piercing member 16. The gasket 18 could, however, seal against the container when it is pierced, or after the container is pierced, without departing from the principles of the present invention.

The T-fitting 20 has the externally threaded connection 36 formed thereon for interconnection of the tool 1 to an industry standard flexible hose (or other type of connector) configured for use in charging R-134a refrigerant systems. The T-fitting 20 also has the externally threaded connection 37 formed thereon for interconnection of the tool 1 to an industry standard flexible hose (or other type of connector) configured for use in charging R-12 refrigerant systems. Thus, when the spacer 62 is used with an industry standard R-12 container, a corresponding industry standard R-12 connector is connected to the threaded connection 37. When no spacer is used in the tool 1 with an industry standard R-134a container received therein, a corresponding industry standard R-134a connector is connected to the threaded connection 36.

Conventional valves 38 (known to those skilled in the art as a Schrader valve) within the fitting 20 block fluid flow outwardly through the fitting, unless an industry standard hose certified for use with R-134a or R-12 refrigerant systems is connected to the respective one of the threaded connections 36, 37. Thus, the fitting 20 also performs a check valve function for both of the connections 36, 37.

For interconnection to an industry standard R-134a refrigerant system connector, the threaded connection 36 has ½ inch nominal diameter, 16 threads per inch Acme threads formed thereon. For interconnection to an industry standard R-12 refrigerant system connector, the threaded connection 37 has 7/16 nominal diameter, 20 threads per inch UNF threads formed thereon.

However, it is to be clearly understood that the fitting 20 could be otherwise configured, without departing from the principles of the present invention. Note that the fitting 20 is molded partially within the handle 12, eliminating the need for any separate attachment member. The piercing member 16 is press-fit into the fitting 20 from opposite side of the container receiving portion 22. Alternatively, the piercing member 16 and fitting 20 could be molded together in the handle 12, and the piercing member and fitting 20 could be integrally formed.

With the tool 1 assembled as shown in FIGS. 1 & 2, the handles 12, 14 are pivoted away from each other and a container 40 or 60 is positioned between the container receiving portions 22, 26. The handles 12, 14 are then pivoted toward each other by biasing the grip portions 24, 28 with one or both of a person's hands. The container receiving portion 26 eventually forces the container 40 or 60 against the piercing member 16, so that the container is pierced and the gasket 18 seals between the container and the container receiving portion 22. Fluid may now be dispensed from the container 40 or 60 through the fitting 20 via a hose or other connector device to a refrigeration system.

Referring specifically to FIG. 1, the tool 1 is representatively illustrated in a closed position with the container 40 positioned between the container receiving portions 22, 26. The container 40 is relatively small. To enable the container receiving portion 26 to bias the container 40 against the piercing member 16 and gasket 18, the spacer 42 of the tool 1 is utilized. The spacer 42 releasably attaches to the container receiving portion 26 opposite the piercing member 16 as shown in FIG. 1. The spacer 42 is illustrated apart from the remainder of the tool 1 in FIG. 6.

The spacer 42 includes a handle attachment portion 44 and an inner generally crescent-shaped spacer portion 46. The attachment portion 44 partially encircles the container receiving portion 26, attaching the spacer 42 to the handle 14. Note that the spacer 42 does not need to span the space 48 between the handles 12, 14, so it is more securely attached to the handles, and a person does not have to manipulate both the handles and the spacer while piercing the container 40 therebetween.

The crescent-shaped portion 46 includes an inner side surface 50 complementarily shaped relative to the container 40, and an outer side surface 52 configured for cooperative engagement with an inner side surface of the container receiving portion 26. The outer side surface 52 has a series of spaced apart abutments 54 formed thereon, which contact the container receiving portion 26.

Figure 6:
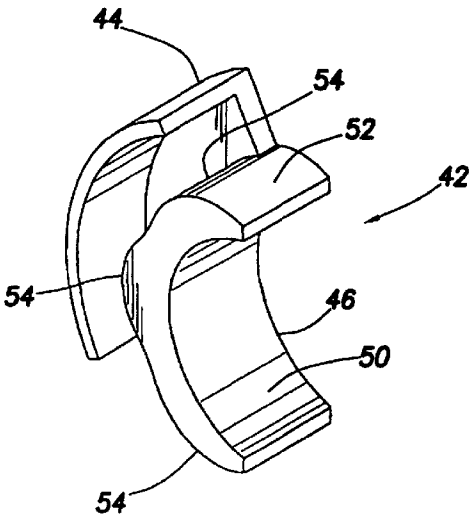
FIG. 6 is an isometric view of the spacer of FIG. 1.

The crescent-shaped portion 46 and the attachment portion 44 together have a generally U-shaped cross-section which is clearly seen in FIG. 6. Note that, when installed on the handle 14, the container receiving portion 26 is received in the open side of the U-shaped cross-section.

The attachment portion 44 is circumferentially offset from the crescent-shaped portion 46. In this manner, the spacer 42 accommodates a variation in thickness of the container receiving portion 26.

It may now be fully appreciated that, by disposing the piercing member 16 approximately ninety degrees from the pivot pin 30 about the container receiving portion 22, piercing of the container 40 is much easier than it would be if the piercing member were disposed adjacent or at the pivot. This is due in part to the fact that, when a person displaces the handle 12 toward the other handle 14, the piercing member 16 displaces toward the container 40 in the same direction. This eliminates any friction produced by translating lateral motion of the handles 12, 14 into longitudinal movement of the container 40.

Referring specifically to FIG. 2, the tool 1 is representatively illustrated in a closed position with the container 60 positioned between the container receiving portions 22, 26. The container 60 is relatively large. To enable the container receiving portion 26 to bias the container 60 against the piercing member 16 and gasket 18, the spacer 62 of the tool 1 is utilized. The spacer 62 releasably attached to the container receiving portion 26 opposite the piercing member 16 as shown in FIG. 2.

The spacer 62 includes a handle attachment portion 64 and an inner generally annular-shaped spacer portion 66. The attachment portion 64 partially encircles the container receiving portion 26, attaching the spacer 62 to the handle 14. As with the spacer 42 described above, the spacer 62 does not need to span the space 48 between the handles 12, 14, so it is more securely attached to the handles, and a person does not have to manipulate both the handles and the spacer while piercing the container 60 therebetween.

The annular-shaped portion 66 includes an inner side surface 70 complementarily shaped relative to the container 60, and an outer side surface 72 configured for cooperative engagement with an inner side surface 68 of the container receiving portion 26. The outer side surface 72 is complementarily shaped relative to the container receiving portion 26 inner side surface 68, instead of the abutments 54 of the spacer 42. That is, the outer side surface 72 of the spacer 62 is in substantially continuous contact with the inner side surface 68 of the container receiving portion 26, whereas the outer side surface 52 of the spacer 42 is only in intermittent contact with the inner side surface 68 of the container receiving portion 26.

The annular-shaped portion 66 and the attachment portion 64 together have a generally U-shaped cross-section and, when installed on the handle 14, the container receiving portion 26 is received in the open side of the U-shaped cross-section, similar to the spacer 42 described above. However, the attachment portion 64 is not circumferentially offset from the annular-shaped portion 66. Instead, the annular-shaped portion 66 is circumferentially aligned with the attachment portion 64.

Without either of the spacers 42 or 62 installed in the handle assembly 10, the inner side surface 68 of the container receiving portion 26 accommodates a relatively large diameter container of refrigerant (not shown, but similar to the refrigerant container 60 and having a larger outer diameter). Preferably, the container is an industry standard container of R-134a refrigerant having an outer diameter of approximately three inches. The inner side surface 68 of the container receiving portion 26 is radiused to conform to the shape of the R-134a refrigerant container (i.e., the container receiving portion would have an inner radius of approximately 1.5 inches) and space it appropriately toward the piercing member 16. The other container receiving portion 22 is also radiused to conform to the shape of the R-134a refrigerant container.

Thus, three industry standard containers may be accommodated by the tool 1 by selecting an appropriate one of the spacers 42, 62, or by using the handle assembly 10 without either of the spacers.

Of course, a person skilled in the art would find it obvious, upon a reading of the above description of an embodiment of the invention, to make many modifications, additions, deletions, substitutions, and other changes to the described embodiment, and such changes are contemplated by the principles of the present invention. Accordingly, the foregoing detailed description is to be clearly understood as being given by way of illustration and example only, the spirit and scope of the present invention being limited solely by the appended claims.

What is claimed is:

1. A tool for use in dispensing fluid from a selected one of at least first and second differently shaped and sized containers into a refrigeration system, the tool comprising:

a handle assembly including first and second pivotably attached handles, each of said handles having a grip portion and a container receiving portion, and a container piercing member projecting inwardly from the first member container receiving portion; and first and second [interchangeable] container spacers, a selected *at least* one of the first and second container spacers being [releasably attached] *positioned relative* to the second handle container receiving portion to position a corresponding one of the [at least] first and second containers laterally away from the second handle container receiving portion and toward the container piercing member, *each of* said first and second [interchangeable] container spacers [having dual surfaces] defining a single unit that engages [inner and outer surfaces of said second handle container receiving portion] *the corresponding one of the first and second containers*.

2. The tool according to claim 1, wherein the first container spacer includes a first handle attachment portion adapted to [at least partially encircle] *attach the first container spacer to* the second handle container receiving portion, and a generally crescent-shaped portion having a first inner side surface complementarily shaped relative to the first container, and wherein the second container spacer includes a second handle attachment portion adapted to [at least partially encircle] *attach the second container spacer to* the second handle container receiving portion, and a generally annular-shaped portion having a second inner side surface complementarily shaped relative to the second container.

3. The tool according to claim 2, wherein a first outer side surface of the generally crescent-shaped portion has a series of spaced apart abutments formed thereon adapted to intermittently contact an inner side surface of the second handle container receiving portion, and wherein a second outer side surface of the generally annular-shaped portion is adapted to substantially continuously contact the second handle container receiving portion inner side surface.

4. The tool according to claim 2, wherein the generally crescent-shaped portion is circumferentially offset relative to the first handle attachment portion, and wherein the generally annular-shaped portion is circumferentially aligned with the second handle attachment portion.

5. The tool according to claim 1, wherein the first and second handles are [separately formed from each other and] pivotably attached via a hinged connection opposite the grip portion of each handle, the first and second handles being releasably securable in a closed position by a locking device [positioned between the first and second handle grip portions].

6. The tool according to claim 5, wherein the piercing member is spaced [about] *approximately* ninety degrees from the hinged connection about the first handle container receiving portion and is positioned opposite the second handle container receiving portion.

7. The tool according to claim 1, wherein the first container is a relatively small diameter industry standard [202×406 size] oil charge container, the first container spacer having a first inner side surface configured to receive the oil charge container therein, and wherein the second container is a relatively larger diameter industry standard [211×413 size] R-12 refrigerant container, the second container spacer having a second inner side surface configured to receive the R-12 refrigerant container therein.

8. The tool according to claim 7, wherein the first inner side surface has an inner radius which is complementarily shaped relative to the oil charge container, and wherein the second inner side surface has an inner radius which is complementarily shaped relative to the R-12 refrigerant container.

9. The tool according to claim 7, wherein [at least one of] *a third inner side surface of* the *second handle* container receiving [portions] *portion* is configured to receive an industry standard [approximately three inch diameter] R-134a refrigerant container [when the first and second container spacers are not attached to the second handle container receiving portion] *therein*.

10. The tool according to claim 1, further comprising multiple connections configured for interconnection to corresponding multiple refrigerant systems, each of the multiple connections being in fluid communication with the container piercing member.

11. The tool according to claim 10, wherein each of the connections is a threaded connection formed on a fitting attached to the container piercing member.

12. The tool according to claim 11, wherein the fitting comprises a T-fitting.

13. The tool according to claim 10, wherein a first one of the connections has ½ inch nominal diameter, 16 threads per inch Acme threads formed thereon, and wherein a second one of the connections has 7/16 nominal diameter, 20 threads per inch UNF threads formed thereon.

14. The tool according to claim 10, wherein a first one of the connections is configured to connect to an R-134a refrigeration system, and wherein a second one of the connections is configured to connect to an R-12 refrigeration system.

15. A tool for use in dispensing fluid from a selected one of at least first, second and third differently shaped and sized containers into a refrigeration system, the tool comprising:

a handle assembly including first and second pivotably attached handles, each of said *first and second* handles having a grip portion and a container receiving portion, the first and second handles being [separately formed from each other and] pivotably attached via a hinged connection opposite the grip portion of each [handle] *of the first and second handles*, each *of the first and second handle* container receiving [portion] *portions* being generally semi-circular shaped, the first and second handles being releasably securable in a closed position by a locking device [positioned between the first and second handle grip portions], and a container piercing member projecting inwardly from the first handle container receiving portion; and first and second [interchangeable] container spacers, each of the *first and second* container spacers being [adapted to releasably attach to] *positionable between* the second handle container receiving portion and [being configured to position] a corresponding one of the [at least] first and second containers *to space the corresponding one of the first and second containers* laterally away from the second handle container receiving portion and toward the container piercing member, the third container being operably receivable in the handle assembly when neither of the first and second spacers is [attached to] *positioned between* the second handle container receiving portion *and the third container, each of* said first and second [interchangeable] container spacers [having dual surfaces] defining a single unit that engages [inner and outer surfaces of said second handle container receiving portion] *the corresponding one of the first and second containers*.

16. The tool according to claim 15, wherein each of the first and second container spacers includes a handle attachment portion adapted to [at least partially encircle] *attach the first container spacer to* the second handle container receiving portion, and an inner spacer portion having an inner side surface [complementarily shaped relative] *configured* to *receive* the corresponding one of the first and second containers *therein*.

17. The tool according to claim 16, wherein the inner spacer portion *of at least one of the first and second container spacers* further has an outer side surface configured for cooperative engagement with an inner side surface of the second handle-container receiving portion.

18. The tool according to claim 17, wherein the inner spacer portion outer side surface of the first spacer has a series of spaced apart abutments formed thereon adapted to intermittently contact the second handle container receiving portion inner side surface, and wherein the inner spacer portion outer side surface of the second spacer, is adapted to substantially continuously contact the second handle container receiving portion inner side surface.

19. The tool according to claim 18, wherein the inner spacer portion and the handle attachment portion of each of the first and second container spacers together have a generally U-shaped cross-section having an open side, the second handle container receiving portion being received in the open side.

20. The tool according to claim 19, wherein the inner spacer portion of the first spacer is circumferentially offset relative to the first spacer handle attachment portion, and wherein the inner spacer portion of the second spacer is circumferentially aligned with the second spacer handle attachment portion.

21. The tool according to claim 15, wherein the piercing member is spaced [about] *approximately* ninety degrees from the hinged connection about the first handle container receiving portion and is positioned opposite the second handle container receiving portion.

22. The tool according to claim 21, wherein the piercing member is molded within the first handle container receiving portion.

23. The tool according to claim 15, further including a gasket disposed about the piercing member and received in a recess [formed in an inner side surface of the first handle container receiving portion].

24. The tool according to claim 15, further comprising multiple connections configured for interconnection to corresponding multiple refrigerant systems, each of the multiple connections being in fluid communication with the container piercing member.

25. The tool according to claim 24, wherein each of the connections is a threaded connection formed on a fitting attached to the container piercing member.

26. The tool according to claim 25, wherein the fitting comprises a T-fitting.

27. The tool according to claim 24, wherein a first one of the connections has ½ inch nominal diameter, 16 threads per inch Acme threads formed thereon, and wherein a second one of the connections has 7/16 nominal diameter, 20 threads per inch UNF threads formed thereon.

28. The tool according to claim 24, wherein a first one of the connections is configured to connect to an R-134a refrigeration system, and wherein a second one of the connections is configured to connect to an R-12 refrigeration system.

29. A tool for dispensing fluid into a refrigeration system from a selected one of an industry standard R-134a refrigerant container, an industry standard oil charge container and an industry standard R-12 refrigerant container, the tool comprising:

a handle assembly including:

first and second pivotably attached handles, each of said handles having a grip portion and a container receiving portion, the first and second handles being [separately formed from each other and] pivotably attached to each other via a hinged connection joining the *first and second handle* container receiving portions to each other, each *of the first and second handle* container receiving [portion] *portions* being generally semi-circular shaped, the first and second handles being releasably securable in a closed position by a locking device [positioned between the first and second handle grip portions], a container piercing member [molded within and] projecting inwardly from the first handle container receiving portion, the piercing member being positioned between the hinged connection and the first handle grip portion, and positioned opposite the second handle container receiving portion, and a gasket disposed about the piercing member and received in a recess [formed in an inner side surface of the first handle container receiving portion];

multiple connections configured for interconnection to corresponding multiple refrigerant systems, each of the multiple connections being in fluid communication with the container piercing member, a first one of the connections being configured to connect to an R-134a refrigeration system, and a second one of the connections being configured to connect to an R-12 refrigeration system; and first and second [interchangeable] container spacers [adapted to releasably attach] *attachable* to the second handle container receiving portion, the first container spacer being configured to position the oil charge container laterally away from the second handle container receiving portion and toward the piercing member, the first container spacer including an inner side surface [complementarily shaped relative] *configured* to *receive* the oil charge container *therein*, the second container spacer being configured to position the R-12 *refrigerant* container laterally away from the second handle container receiving portion and toward the piercing member, the second container spacer including an inner side surface [complementarily shaped relative] *configured* to *receive* the R-12 refrigerant container *therein*, and the handle assembly being configured to operably receive the R-134a refrigerant container therein when neither of the spacers is [attached to] *positioned between the R-134a refrigerant container and* the second handle container receiving portion, and the second handle container receiving portion being [radiused] *configured* to receive the R-134a refrigerant container *therein*.

* * * * *